United States Patent [19]

Bello et al.

[11] Patent Number: 4,584,623

[45] Date of Patent: Apr. 22, 1986

[54] ELECTRICAL LOAD PROTECTION DEVICE

[75] Inventors: Ernesto Bello, Miami Springs; Joseph F. Mibelli, Miami, both of Fla.

[73] Assignee: Watsco, Inc., Hialeah, Fla.

[21] Appl. No.: 549,308

[22] Filed: Nov. 7, 1983

[51] Int. Cl.⁴ .................... H02H 3/20; H02H 3/247
[52] U.S. Cl. .......................... 361/90; 361/22; 361/33; 361/187
[58] Field of Search ................... 361/90, 91, 92, 86, 361/22, 33, 187; 323/239; 340/660, 661, 663; 307/130, 358, 360; 318/459, 479

[56] References Cited

U.S. PATENT DOCUMENTS

| | | | |
|---|---|---|---|
| 3,149,224 | 9/1964 | Horne et al. | 323/239 |
| 3,341,748 | 9/1967 | Kammiller | 307/130 X |
| 3,590,325 | 6/1971 | McMillen | 340/663 |
| 3,657,603 | 4/1972 | Adams | 361/90 |
| 3,800,198 | 3/1974 | Graf et al. | 361/90 |
| 4,502,287 | 3/1985 | Hare et al. | 361/92 X |

FOREIGN PATENT DOCUMENTS 2525393 12/1976 Fed. Rep. of Germany ........ 361/90

OTHER PUBLICATIONS

"One Chip Guards Against Overvoltage, Line Loss, and Brownout"—Hopkins et al., *Electronic Design*, 11/81, pp. 248 and 250.

*Primary Examiner*—Harry E. Moose, Jr.
*Attorney, Agent, or Firm*—Ernest H. Schmidt

[57] ABSTRACT

Electronic circuitry senses over-voltage and under-voltage within narrow threshold limits, and voltage interruption, in the energization circuit of a sensitive load, such as a refrigeration compressor motor load, to protect against overheating damage and burn-out. Setting to a nominal operating line voltage is provided for to obviate readjustment to the threshold voltages of a window comparator utilized to sense over-voltage and under-voltage.

7 Claims, 3 Drawing Figures

ELECTRICAL LOAD PROTECTION DEVICE

BACKGROUND OF THE INVENTION

This invention relates to electrical load protection devices, and is directed particularly to electric motor protection devices or line monitors offering protection against low or high energizing voltages and momentary voltage interruptions which might otherwise damage a motor applied as the line load. Such load detectors or line monitors are particularly advantageous when applied to the electrical energization source of refrigeration compressor motors, such motors being particularly susceptible to damage caused by low or high voltages, or momentary power interruption. With excessively high or low energization voltage, the motor will draw abnormally high current, subjecting it to accelerated failure or burn-out. With momentary power interruption, existing forces of compression within the unit cause such excessively high starting currents as could result in almost immediate burn-out. This is particularly true when the compressor unit back pressure load is high enough to result in a locked rotor upon attempted automatic re-start after a very brief power interruption.

Such devices heretofore devised for protection against early failure due to overheating or burn-out include thermal interrupter switches and electronically controlled line monitors of one type or another in which low energizing voltage or momentary voltage interruptions are sensed for activation or deactivation of a switching relay in series with the energizing voltage line. Such protective devices are deficient in various respects, principally in that they are too slow-acting to prevent some damaging heat build-up, and in that they are not sufficiently responsive to over-voltage as an insidious long or short term damaging condition.

It is, accordingly, the principle object of this invention to provide a novel and improved line monitor or protective device for electric motors, particularly but not exclusively for refrigeration equipment compressor motors, that obviates the deficiencies such devices heretofore devised.

A more particular object of the invention is to provide an electrical load protection device of the character described which protects against over-voltage as well as under-voltage within narrow and precise tolerance thresholds.

Another object of the invention is to provide an electrical load protection device of the character described that provides for selection to a nominal line voltage determining the actual pickup and drop-out of the threshold voltages.

Another object of the invention is to provide an electrical load protection device of the above nature wherein, upon activation resulting from any detected over-voltage, under-voltage or voltage interruption condition, power is cut off for a time sufficient for cooling of the motor to a degree that insures against any liklihood of damage upon the automatic switching on again of the energizing voltage.

Other objects, features and advantages of the invention will be apparent from the following description when read with reference to the accompanying drawings. In the drawings, wherein like reference numerals denote corresponding parts:

In brief, the invention comprises a window comparator circuit which constantly monitors the level of the line voltage feeding it and the electric motor or other appliance constituting the load. Whenever the magnitude of the line voltage deviates by more than approximately 10%, above or below, from a nominal and selectable value, a regenerative delay circuit or "one shot" is activated. The output of the delay circuit interrupts power to the motor or other electrical load by any suitable means, preferably an electromechanical relay driven by a solid state relay driver operating directly off the AC line. To ensure adequate protection of sensitive loads, the power is kept off the load for a period of several minutes, even if the line voltage returns to a normal value.

All the electronic circuitry of the device is powered by a well regulated supply derived from the same power line feeding the load. This contributes to consistent and reliable protection within narrow limits, with a minimum of adjustment.

Figure 1:
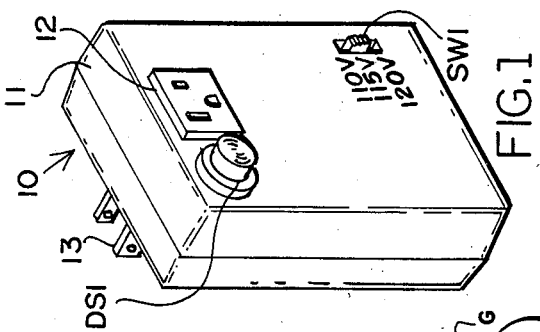
FIG. 1 is an oblique view as seen from the front of an electrical load protection device embodying the invention.
Figure 2:
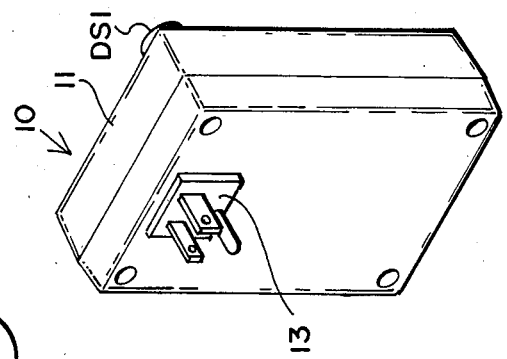
FIG. 2 is an oblique view as seen from the rear of the device.

As illustrated in FIG. 1 and 2 the electrical load protection device 10 comprises a rectangular housing 11 the front of which is provided with a three prong receptacle 12 and the rear of which is provided with an outwardly projecting, three pronged, grounded plug 13 for direct plugging into an ordinary receptacle furnishing a nominal 115 Volt 60 cycle AC electrical current. As is hereinafter described, the electrical circuitry within the housing 10 protects the load plugged into the receptacle 12 when the device is plugged into the supply receptacle so as to place the device in the series with the load.

Detailed Description of Electrical Circuitry

Figure 3:
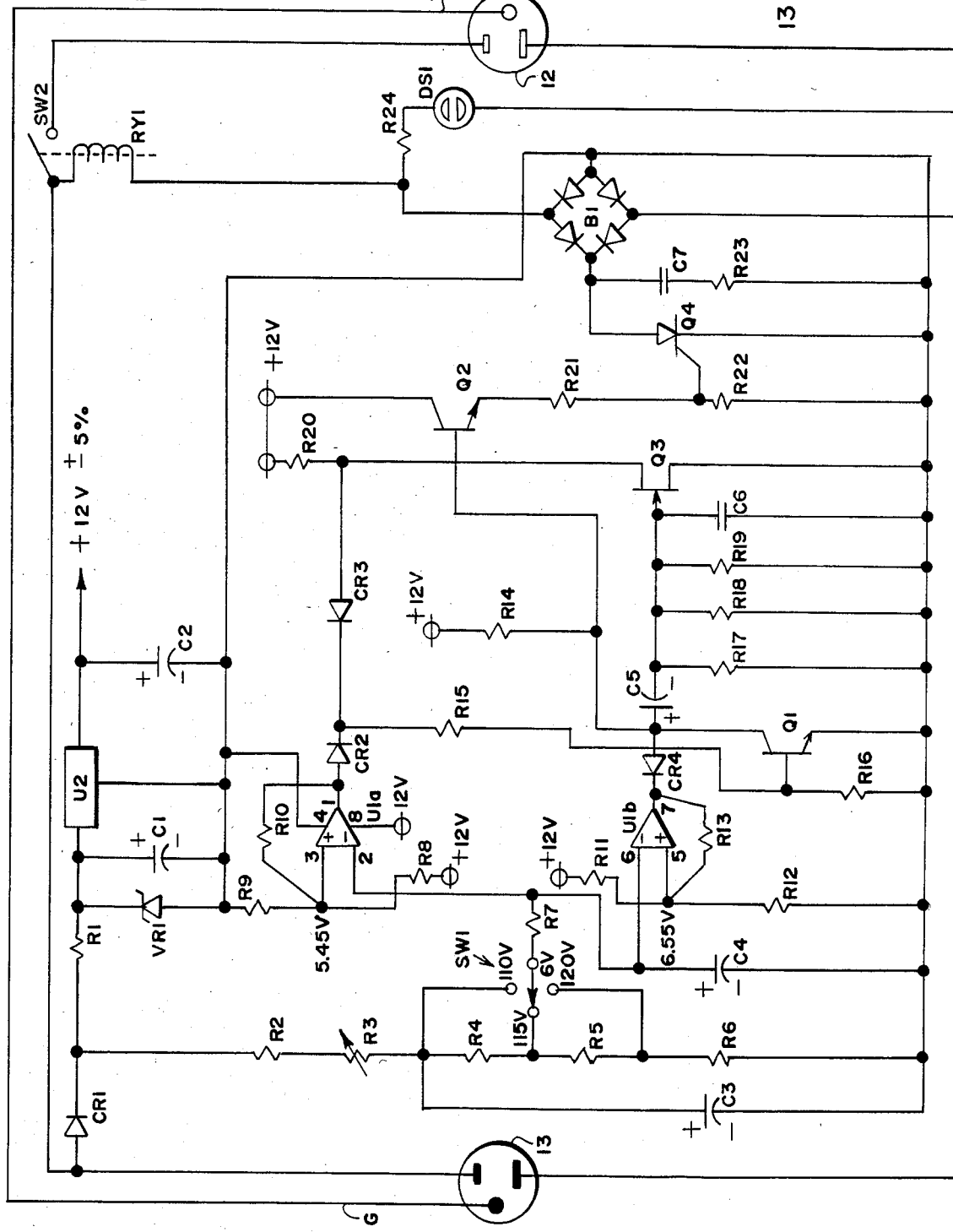
FIG. 3 is an electrical schematic drawing of a preferred form electrical load protection device embodying the invention.

Referring now in detail to the schematic drawing of FIG. 3, illustrating a preferred embodiment of the invention, a power supply circuit comprising rectifier CR1, limiting resistor R1 and Zener diode VR1, scales down the line voltage before it is applied to the monolithic regulator U2 and its associated capacitors C1 and C2. The output of the monolithic regulator is a stable 12 VDC which is used to power the circuitry of the device and to establish the internal references used to determine the magnitude of the line voltage to the load.

Concurrently, rectifier diode CR1, resistors R2 through R6 and filter capacitor C3 are used to derive a DC voltage analog of the magnitude of the line voltage at any moment. Variable resistor R3 is used to calibrate the voltage divider string in such a way that 6 VDC is present at the junction of resistors R3-R4 whenever the line voltage is 110 Volt AC. The values of the resistive divider are chosen such that, for the same calibration, 6 VDC will appear at the junction of resistors R4-R5 if the line voltage is 115 Volt AC and 6 VDC will appear at the junction of resistors R5-R6 whenever the line voltage is at 120 VAC. In this manner, the nominal operating line voltage for the load can be selected by means of a switch SW-1 without requiring readjustments to the threshold voltages of the window comparator.

The line voltage analog selected by voltage selector switch SW-1 is applied to the dual inputs of a window comparator through resistor R7 and further smoothed by filter capacitor C4. The comparator itself is comprised of two identical operational amplifiers U1a and U1b operated as voltage comparators with hysterisis. Resistor divider R8-R9 derives the under-voltage threshold reference of 5.45 VDC while resistor divider R11-R12 derives the over-voltage threshold of 6.55 VDC Resistors R10 and R13 provide about 5% of hysterisis which, in conjunction with the thresholds, determine the actual pickup and dropout voltages for relay RY1, as is hereinafter more particularly described.

Whenever the selected nominal line voltage is present, a 6 VDC level is applied to both inverting inputs of the comparators. Therefore, if the line voltage should drop, so will the 6 VDC level drop. Whenever the line voltage has dropped enough to make the voltage at the inverting input of U1a less than the reference voltage at its non-inverting input, this comparator will cause its output to change states, going from ground to the plus 12 VDC supply. This signals an under-voltage condition to the regenerative delay circuit or "one-shot". Conversely, if the line voltage rises so that the voltage level at the inverting input of U1b is higher than the reference level at its non-inverting input, then the output of U1b will change states going from the plus supply to ground and signaling an over-voltage condition to the "one-shot".

The regenerative delay circuit or "one-shot" is made up of transistor Q1, junction FET Q3, diodes CR2, CR3 and CR4, capacitors C5 and C6 and resistors R14 through R20.

If the selected line voltage is at its nominal valve, transistor Q1 is kept cut off by R16 and its collector sits very near the plus supply voltage of 12 VDC. Also, CR2 and CR4 are reverse biased, and so is CR3, since Q3 is conducting due to its gate and source being tied together through the parallel combination of R17, R18 and R19. Under these conditions, emitter follower Q2 drives the gate of SCR Q4 through resistor divider R21 and R22. With Q4 conducting, AC current can flow in both directions through bridge B1 and energize the coil of relay RY1 which applies power to the appliance being monitored by close-circuiting its associated switch. Neon lamp DS1, in series with voltage dropping resistor 24 is turned off, indicating normal operation of the motor or other electrical load.

If, on the other hand, the line voltage is below the selected value by 10% then the output of the under-voltage comparator U1a goes to plus 12 VDC, which forward biases CR2 and drives Q1 into saturation. While in saturation, the collector of Q1 is at ground potential, which causes two things to happen: transistor Q2 stops conducting thereby opening SCR Q4 and stopping the flow of current through bridge B1 and the coil of RY1 which cuts power to the load; at the same time, capacitor C5 reverse biases the gate of Q3 which stops conducting. While the junction FET Q3 is not conducting, its drain terminal is at the plus supply potential of 12 VDC, which forward biases CR3 through R20. This condition forces Q1 into saturation through R15, even if the under-voltage condition goes away and the output of U1a goes to ground. Only when C5 has discharged enough will Q3 conduct again and remove the drive from Q1, allowing Q2 to conduct again and drive the SCR Q4. As shown, regenerative action through CR3 keeps Q4 in a non-conducting state for as long as C5 is discharging through R17, R18 and R19 even in the event of the under-voltage condition correcting itself after a brief occurrence. The built-in delay determined by the values of C5, R17, R18 and R19 protects loads such as compressors from damaging surges. One or two of the discharge resistors R17, R18 and R19 can be cut out of the circuit, selectively, to lengthen the time delay, as may be desired in any particular application.

In much the same manner, if the line voltage exceeds the selected nominal value, the output of U1b will go to ground, forward biasing CR4 and forcing the collector of Q1 to go to ground. Since this has the same effect as driving Q1 into saturation through R15, the relay RY1 is once again deactivated and the "one-shot" latches itself in that position for as long as C5 is discharging through resistors R17, R18 and R19. It is to be noted that the "one-shot" always latches by causing Q1 to saturate through CR3, R20 and R15.

Whenever Q4 is conducting, current can flow in both directions through the diodes of bridge B1, effectively connecting the coil of RY1 across the power line. This action also turns off neon lamp DS1, which can only be energized if Q4 is open and blocking the current flow through B1. The neon lamp thus indicates when power is not being applied to the load.

Power is conveyed to the load by way of the three wire receptacle 12. The neutral side of this receptacle is connected to the neutral of the line through input plug 13, and the hot side of receptacle 12 is connected to the hot side of the load energizing line through the normally open contacts of RY1. The ground wire is continuous from input plug 13 to output receptacle 13.

As an aid to those skilled in the art and having the right to practice the invention, the following listed values and identifications of the circuit components which have been found to best fulfill the objectives of the invention are given by way of example:

| CAPACITORS | | RESISTORS | |
|---|---|---|---|
| C-1 | 22 mfd | R-1 | 4 Kilohm |
| C-2 | 1 mfd | R-2 | 150 Kilohm |
| C-3 | 22 mfd | R-3 | 20 Kilohm |
| C-4 | 1 mfd | | variable |
| C-5 | 22 mfd | | calibrating |
| C-6 | .01 mfd | R-4 | 806 ohm |
| C-7 | .01 mfd | R-5 | 698 ohm |
| DIODES | | R-6 | 18.7 Kilohm |
| CR-1 | 1N4005 | R-7 | 10 Kilohm |
| CR-2 | 1N4148 | R-8 | 12.1 Kilohm |
| CR-3 | 1N4148 | R-9 | 10 Kilohm |
| CR-4 | 1N4148 | R-10 | 178 Kilohm |
| VR1 | 1N5248B | R-11 | 10 Kilohm |
| B1 | EB04 | R-12 | 12.1 Kilohm |
| TRANSISTORS | | R-13 | 150 Kilohm |
| Q-1 | 2N3904 | R-14 | 22 Kilohm |
| Q-2 | 2N3904 | R-15 | 100 Kilohm |
| Q-3 | 2N5457 | R-16 | 47 Kilohm |
| Q-4 | EC103D (SCR) | R-17 | 9.1 Megohm |
| INTEGRATED CIRCUITS | | R-18 | 18 Megohm |
| U1 | LM358 - Dual Op-Amp. | R-19 | 22 Megohm |
| | | R-20 | 47 Kilohm |
| U2 | 78L12 - Monolithic Voltage Regulator | R-21 | 8.2 Kilohm |
| | | R-22 | 2.7 Kilohm |
| | | R-23 | 100 ohm |
| | | R-24 | 47 Kilohm |

While there is illustrated and described herein a preferred embodiment of our electrical load protection device, this embodiment is presented by way of example only and not in a limiting sense. For example, instead of directly switching the power source to a single phase load as herein described, the control voltage sensing circuit could instead be utilized to actuate low voltage control relays of the type commonly used in air conditioning equipment, whether single phase or multi-phase. The invention in brief comprises all the embodiments and modification coming within the scope and spirit of the following claims.

What we claim as new and desire to secure by Letters Patent is:

1. Electrical circuitry for protecting an electrical load energized by a source of alternating current supply voltage comprising, in combination, switch means for disconnecting the energization supply voltage source from the electrical load, a first means controlled by a predetermined increase in the supply voltage source for actuating said switch means to disconnect said energization supply voltage source from the electrical load, a second means controlled by a predetermined decrease in the supply voltage for actuating said switch means to disconnect said energization supply voltage source from the electrical load, said second means further being controlled by a temporary interruption of said energization supply voltage source to actuate said switch means for disconnecting said energization supply voltage source from the electrical load for a predetermined minimum interval of time, said first and second means comprising a window comparator circuit, the input voltage to said window comparator circuit being derived as a direct current analog of said energization supply voltage source, voltage divider means for adjusting said analog input voltage to correspond with a predetermined "normal" energization supply voltage, a regenerative delay circuit controlled by the output of said window comparator circuit, said regenerative delay circuit including a capacitor discharge circuit for establishing said predetermined interval of time for the disconnection of said energization supply voltage source from the electrical load.

2. Electrical load protecting circuitry as defined in claim 1 wherein said switch means comprises an electrical switching relay, and means controlled by the output of said regenerative delay circuit for energizing said electrical switching relay.

3. Electrical load protecting circuitry as defined in claim 2 wherein said electrical switching relay energizing means comprises a solid state relay driver.

4. Electrical load protecting circuitry as defined in claim 3 wherein said electrical switching relay is energized by the full potential of said supply voltage, said energizing supply voltage for said switching relay being controlled by said solid state relay driver.

5. Electrical load protecting circuitry as defined in claim 4 including an electrical indicator lamp and a circuit for energizing said indicator lamp when said switching relay is de-energized.

6. Electrical load protecting circuitry as defined in claim 4 including a circuit supplying full potential energization supply voltage to said electrical switching relay, a full-wave diode bridge connected in series with said energizing supply voltage for said switching relay, said solid state relay driver being connected across said bridge so as to inhibit the flow of current therethrough to said switching relay when said solid state relay driver is non-conducting.

7. Electrical load protecting circuitry as defined in claim 6 and further including an electrical indicator lamp and a circuit for energizing said electrical indicator lamp, said indicator lamp energizing circuit being connected in parallel with said series connection across said bridge, whereby said indicator lamp energizing circuit will be energized when said solid state relay driver is non-conducting.

* * * * *